United States Patent [19]

Chengalvarayan

[11] Patent Number: 6,112,175
[45] Date of Patent: Aug. 29, 2000

[54] SPEAKER ADAPTATION USING DISCRIMINATIVE LINEAR REGRESSION ON TIME-VARYING MEAN PARAMETERS IN TRENDED HMM

[75] Inventor: Rathinavelu Chengalvarayan, Lisle, Ill.

[73] Assignee: Lucent Technologies Inc., Murray Hill, N.J.

[21] Appl. No.: 09/032,902

[22] Filed: Mar. 2, 1998

[51] Int. Cl.$^7$ .................................................. G10L 15/14
[52] U.S. Cl. ......................... 704/256; 704/252; 704/255
[58] Field of Search .................................. 704/255, 252, 704/256

[56] References Cited

U.S. PATENT DOCUMENTS 5,835,890  11/1998  Matsui et al. ........................... 704/255

OTHER PUBLICATIONS

Ki Young Lee "Recuresive estimation on the trended HMM in speech enhancement" PP 239–242, Nov. 1996.

C. J. Leggetter et al., "Maximum Likelihood Linear Regression For Speaker Adaptation of Continuous Density Hidden Markov Models", *Computer Speech and Language*, vol. 9, pp. 171–185, 1995.

M. Padmanabhan et al., "Speaker Clustering And Transformation For Speaker Adaptation In Large–Vocabulary Speech Recognition Systems", *Proceedings ICASSP*, vol. 2, pp. 701–704, 1996.

A. Sankar et al., "An Experimental Study of Acoustic Adaptation Algorithms", *Proceedings ICASSP*, vol. 2, pp. 713–716, 1996.

J. Takahashi et al., "Minimum Classification Error–Training For a Small Amount of Data Enhanced By Vector–Field–Smoothed Bayesian Learning", *Proceedings ICASSP*, vol. 2, pp. 597–600, 1996.

C. Rathinavelu et al., "The Trended HMM With Discriminative Training For Phonetic Classifcation", *Proceedings ICSLP*, vol. 2, pp. 1049–1052, 1996.

T. Matsui et al., "A Study of Speaker Adaptation Based on Minimum Classification Error Training",*EUROSPEECH '95*, vol. 1, pp. 81–84, 1995.

L. Deng et al., "Speech Recognition Using Hidden Markov Models with Polynomial Regression Functions as Nonstationary States", *IEEE Transactions on Speech and Audio Processing*, vol. 2, No. 4, pp. 507–520, 1994.

C. M. Ayer et al., "A Discriminatively Derived Linear Transform for Improved Speech Recognition", *Proc. EUROSPEECH*, vol. 1, pp. 583–586, 1993.

*Primary Examiner*—David R. Hudspeth
*Assistant Examiner*—Daniel Abebe
*Attorney, Agent, or Firm*—Jack R. Penrod

[57] ABSTRACT

A method and apparatus using a combined MLLR and MCE approach to estimating the time-varying polynomial Gaussian mean functions in the trended HMM has advantageous results. This integrated approach is referred to as the minimum classification error linear regression (MCELR), which has been developed and implemented in speaker adaptation experiments using a large body of utterances from different types of speakers. Experimental results show that the adaptation of linear regression on time-varying mean parameters is always better when fewer than three adaptation tokens are used.

7 Claims, 4 Drawing Sheets

| NUMBER OF ADAPTATION TOKENS | POLYNOMIAL ORDER | | | |
|---|---|---|---|---|
| | P=0, SI=69.95% | | P=1, SI=75.48% | |
| | ML | MCELR | ML | MCELR |
| 1 | 58.35% | 76.44% | 46.82% | 79.44% |
| 2 | 71.15% | 78.13% | 74.58% | 82.69% |
| 3 | 77.7% | 80.29% | 82.52% | 84.74% |

*FIG. 4*

SPEAKER ADAPTATION USING DISCRIMINATIVE LINEAR REGRESSION ON TIME-VARYING MEAN PARAMETERS IN TRENDED HMM

BACKGROUND

In the last couple of years, there has been much interest in the two areas of feature-space transformation and model-space transformation based adaptation in order to reduce the speech recognition errors caused by acoustic mismatches between the training and testing conditions.

Research and experiments have shown that there can be some improvements by employing the model-space approach instead of the feature-space approach. One model-space approach using a formulation of trended HMM (also known as trajectory-based HMM or nonstationary-state HMM), see L. Deng et al. "Speech Recognition using hidden Markov models with polynomial regression functions as nonstationary states" IEEE Transactions on Speech and Audio Processing, Vol. 2, No. 4, pp 507–520, 1994, has been successfully used in automatic speech recognition applications for the past few years. More recently, a minimum classification error training (MCE) procedure has been developed for trended HMM to improve the discriminating ability of maximum-likelihood (ML) criterion, see R. Chengalvarayan and L. Deng, "The trended HMM with discriminative training for phonetic classification", Proceedings ICSLP, Vol 2, pp. 1049–1052, 1996. This MCE training approach aims at directly minimizing the recognition error rate of the training data by taking into account other competing models and has recently been used in speaker adaptation applications.

The above presented model space approaches in trended HMM have proven to be advantageous if applied to speech recognition alone. However, since speech recognition has not reached perfection yet, there are still other advantages to pursue and there is still room to improve.

SUMMARY

Thus, it is an object of the invention to achieve even greater advances by combining training techniques with linear transformation techniques in a trended HMM speech recognizer in a way in which the techniques would complement each other.

Thus, it is another object of the invention to advance the speech recognition art by providing an MCE training method for optimally estimating the linear transformations to the set of time-varying mean parameters in a trended HMM.

Briefly stated, in accordance with one aspect of the invention, the aforementioned objects are achieved by providing a model-space transformation method which adapts a set of speaker independent models to a specific speaker by applying a set of linear transformations to the Gaussian mean vectors.

In accordance with another aspect of the invention, the aforementioned objects are achieved by providing a method of recognizing speech which includes the steps of: applying global linear regression based speaker adaption using MCE-based discriminative training in a trended HMM; optimally estimating time varying polynomial Gaussian mean functions in the trended HMM; and sequentially performing modified viterbi score calculations for each alphabet classification task.

BRIEF DESCRIPTION OF THE DRAWINGS

FIG. 4 is a table of experimental results and performance of this speech recognizer.

DETAILED DESCRIPTION

Figure 1:
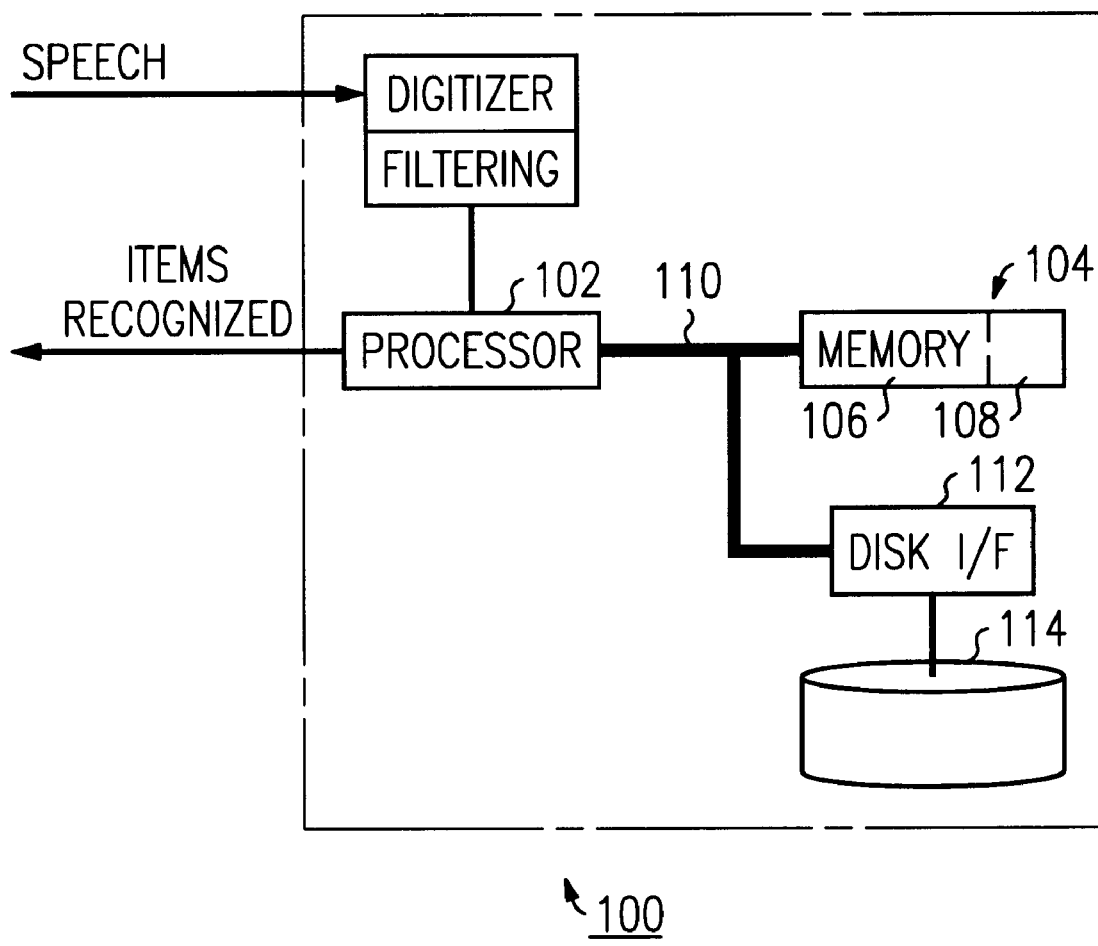
FIG. 1 is a block diagram of a computer system for automatic speech recognition training and implementation.

Referring now to FIG. 1, a system 100 is shown. System 100 has a processor 102 and a memory 104 connected by bus 110 in a standard processor-memory architecture. Memory 104 has a random access portion 106 and typically also has a read-only portion 108. The processor 102 and memory are also connected by bus 110 to disk interface 112. Disk interface 112 is connected to a disk drive 114, which is a mass storage device. The disk drive 114 typically stores the operating system of the system 100. It also stores programs and data files used by the processor 102 to perform speech recognition according to the present invention.

The speech recognition program is stored in disk drive 114 and loaded into memory 106 when needed. This speech recognition program uses a trended HMM incorporating linear regression matrices. This particular trended HMM is of a data-generative type and can be described as $$O_t = \sum_{p=0}^{P} B_i(p)(t - \tau_i)^p + R_t(\Sigma_i)_t$$

where $O_t$, $t=1,2,\ldots,T$ is a modeled observation data sequence of length T, within the HMM state indexed by i; $B_i(p)$ are state-dependent polynomial regression coefficients of order P indexed by state i, and the term $R_t$ is the stationary residual assumed to be independent and identically distributed (IID) and zero-mean Gaussian source characterized by state-dependent, but time-invariant covariance matrix $\Sigma_i$. The term $t-\tau_i$ represents the sojourn time in state i at time t, where $\tau_i$ registers the time when state i in the HMM is just entered before regression on time takes place. The adaptation of the mean parameter is performed by applying a global transformation matrix to each of the state-dependent polynomial coefficients according to $$\hat{B}_i(p) = W(p)B_i(p)$$

where W(p) is a d×d matrix, with d being the dimension associated with each set of polynomial coefficients. This minimizes the recognition errors of the adaptation data. The particular HMM was developed such that each state of the adapted model is characterized by a multivariate Gaussian density function with diagonal covariance matrices in the form of $$b_i(O_\lambda) = \frac{(2\pi)^{-\frac{n}{2}}}{|\Sigma_i|^{\frac{1}{2}}} \exp\left(\frac{-1}{2}\left[O_\lambda - \sum_{p=0}^{P} W(p)B_i(p)(t-\tau_i)^p\right]^{T_r} \Sigma_i^{-1} \left[O_\lambda - \sum_{p=0}^{P} W(p)B_i(p)(t-\tau_i)^p\right]\right)$$

where $B_i(p)$, $\Sigma_i$ denotes the polynomial coefficients for the time-varying mean functions and the variances for the i-th state, respectively; (t-$\tau_i$) is the sojourn time in state i at time t and d is the dimensionality of vector O. Superscripts Tr, −1 and the symbol ‖ denote the matrix transposition, inversion, and determinant, respectively.

For estimation of the linear regression matrices a preferred embodiment was evaluated. This preferred embodiment of the invention which was developed, implemented and has MCE-based discriminative training paradigm in the context of the trended HMM for achieving optimal estimation of the global regression matrices associated with each set of polynomial coefficients. Let $\Phi_j$, j=1,2, . . . , K, denote the parameter set characterizing the trended HMM for the j-th class, where K is the total number of classes. The classifier based on these K class models can be characterized by $\Phi = \Phi_1, \Phi_2, \ldots, \Phi_K$. Let $g_j(O, \Phi)$ denote the log-likelihood associated with the optimal state sequence $\Theta$ for the input token O, (note that the input tokens are special cases of the utterances) obtained by applying the Viterbi algorithm using model $\Phi_j$ for the j-th class. Then, for the utterance O (from class c), the misclassification measure $d_c(O, \Phi)$ is determined by $$d_c(O,\Phi) = -g_c(O,\Phi) + g_\chi(O,\Phi),$$

where $\chi$ denotes the incorrect model with the highest log-likelihood. A loss function with respect to the input token is finally defined in terms of the misclassification measure given by $$\gamma(O, \Phi) = \frac{1}{1 + e^{-(d_c(O,\Phi))^2}}$$

which projects $d_c(O,\Phi)$ Into the interval [0,1]. Note that the loss function $$Y(O,\Phi)$$

is directly related to the classification error rate and is first-order differentiable with respect to each global regression matrix parameters.

Let $\phi$ be a parameter in the model $\Phi$. Provided that $$Y(O,\Phi)$$

is differentiable with respect to $\phi$, that parameter is adjusted in the gradient decent method according to $$\hat{\phi} = \phi - \epsilon \frac{\partial \gamma(O, \Phi)}{\partial \phi}, \text{ or }$$

$$\hat{\phi} = \phi - \epsilon \gamma(O, \Phi)(\gamma(O, \Phi) - 1) \frac{\partial d_c(O, \Phi)}{\partial \phi}$$

In the equation immediately above, $\hat{\phi}$ is the new estimate of the parameter and $\in$ is a small positive constant which monotonically decreases as the iteration number increases. This gradient descent method is iteratively applied to all training tokens in a sequential manner (for each global regression matrix parameters) to minimize the loss function during the training process. By applying the chain rule results in the equation above, the gradient calculation of i-th state parameter $W_{i,j}(r)$, r=0,1, . . . , P, for the j-th model becomes $$\frac{\partial \gamma(O, \Phi)}{\partial W_{i,j}(r)} = \psi \frac{\partial d_c(O, \Phi)}{\partial W_{i,j}(r)}$$

$$= \psi \frac{\partial}{\partial W_{i,j}(r)} (-g_c(O, \Phi) + g_\chi(O, \Phi))$$

$$= \psi \frac{\partial}{\partial W_{i,j}(r)} \left( -\sum_{i=1}^{T} \log b_{d_i^c}(O_\lambda | \tau_{d_i^c}) + \sum_{i=1}^{T} \log b_{d_i^\chi}(O_\lambda | \tau_{d_i^\chi}) \right)$$

$$= \psi_j \sum_{\lambda \in T_i(j)} \Sigma_{i,j}^{-1} \left[ O_\lambda - \sum_{p=0}^{P} B_{i,j}(p)(t-\tau_i)^p \right] [B_{i,j}(p)]^{T_i} (t-\tau_i)^i$$

where the adaptive step size is defined as $$\psi_j = \begin{cases} \psi & \text{if } j = c \text{ (correct-class)} \\ -\psi & \text{if } j = \chi \text{ (wrong-class)} \\ 0 & \text{otherwise} \end{cases}$$

and the set $T_i(j)$ includes all the time induces such that the state index of the state sequence at time t belongs to state i-th in the N-state Markov chain $$T_i(j) = \{+|v_\lambda^i = +\}, 1 \leq + \leq N, 1 \leq + \leq T.$$

To reduce the model complexity as well as to get robust estimates from a small amount of adaptation data, in experiments all the state and model dependent transformation matrices $W_{i,j}(r)$ were tied to a global parameter $W(r)$. For this special experimental case, the gradient is given by $$\frac{\partial \gamma(O, \Phi)}{\partial W(r)} =$$

$$\sum_{j=1}^{K} \psi_j \sum_{i=1}^{M} \sum_{\lambda \in T_i(j)} (t-\tau_i)^i \Sigma_{i,j}^{-1} \left[ O_\lambda - \sum_{p=0}^{P} \hat{B}_{i,j}(p)(t-\tau_i)^p \right] [B_{i,j}(p)]^{T_i}$$

The other model parameters are not adapted since the main differences between speakers are assumed to be purely represented by the time-varying mean parameters.

Figure 2:
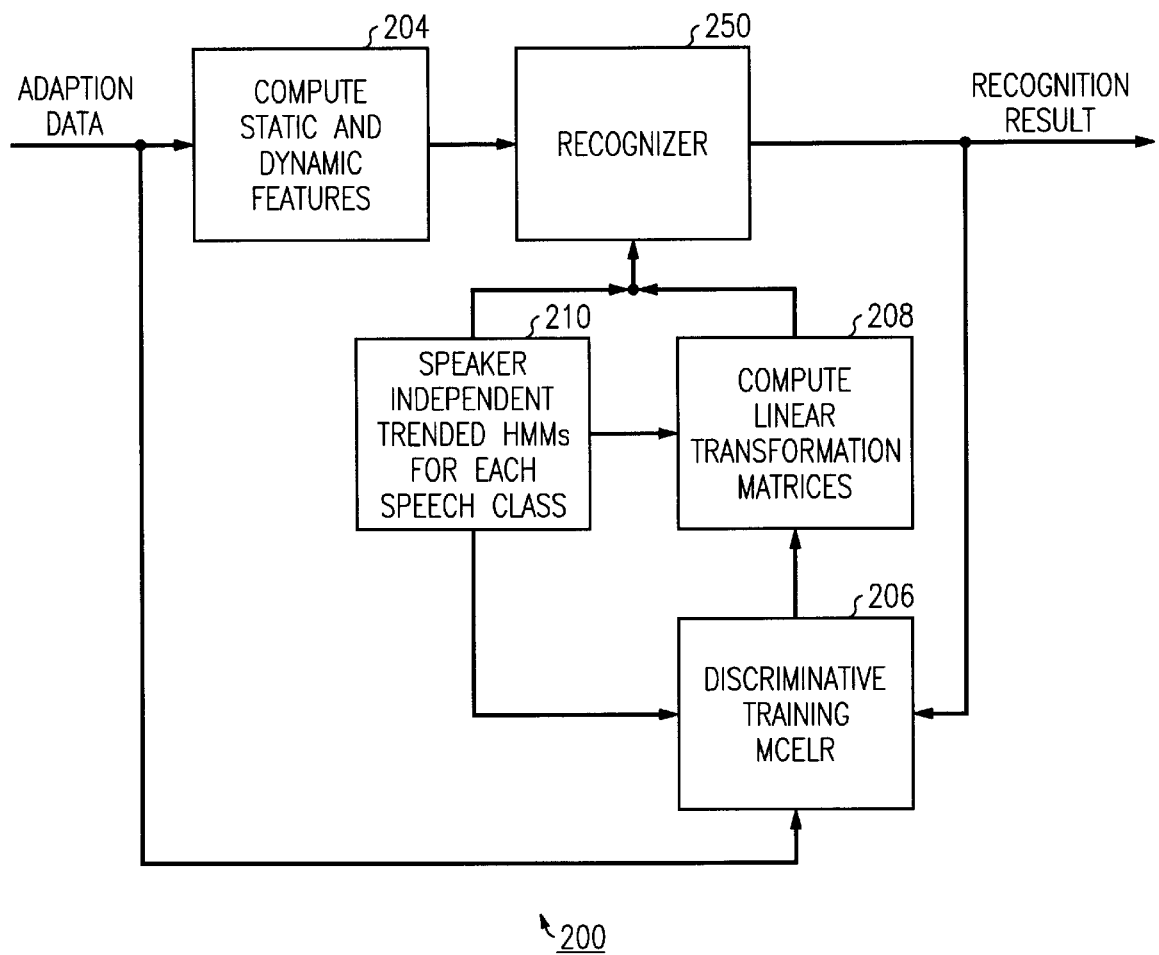
FIG. 2 is a functional block diagram showing the functions performed in one embodiment of a speech recognizer.

Referring now to FIG. 2, an embodiment of the previously presented description shall be presented. In FIG. 2 a method 200 according to the invention utilizing the system shown in FIG. 1 is presented. Method 200 is a method for adapting a trended HMM to a specific speaker. In order to accomplish this, one or more speaker specific sets of adaption data (also known as speaker specific tokens) are transmitted along line 202 to block 204 where static and dynamic features of the speaker specific set or sets of adaption data are computed. The speaker specific adaption data on line 202 is also transmitted to block 206. In the operation represented by block 206 discriminative training for minimum classification error with linear regression (MCELR) is performed. To perform the MCELR function, the operation of block 206 also receives speaker independent model from block 210 for each of a plurality of classes. The speaker independent model is a pre-determined compilation from numerous speakers. It is this compilation of models that is adapted to a specific speaker. The output of block 206 is transmitted to block 208 where linear transformation matrices are computed. An output of block 210 is also received and used by block 208 to compute the linear transform matrices.

After all of this preparation, (with the exception of the feedback line to be discussed below) the next operation is that of block 250 which is a recognizer operation. The recognizer receives computed static and dynamic data form block 204, computed linear transformation matrices from block 208 and speaker independent trended HMMs data for each class from block 210. From these three data inputs, recognizer 250 produces a recognition result as an output. This recognition result output is also fed back to block 206 to aid the discriminative training MCELR. Experimental results of the speech recognition method 200 are given below in the operation portion.

Figure 3:
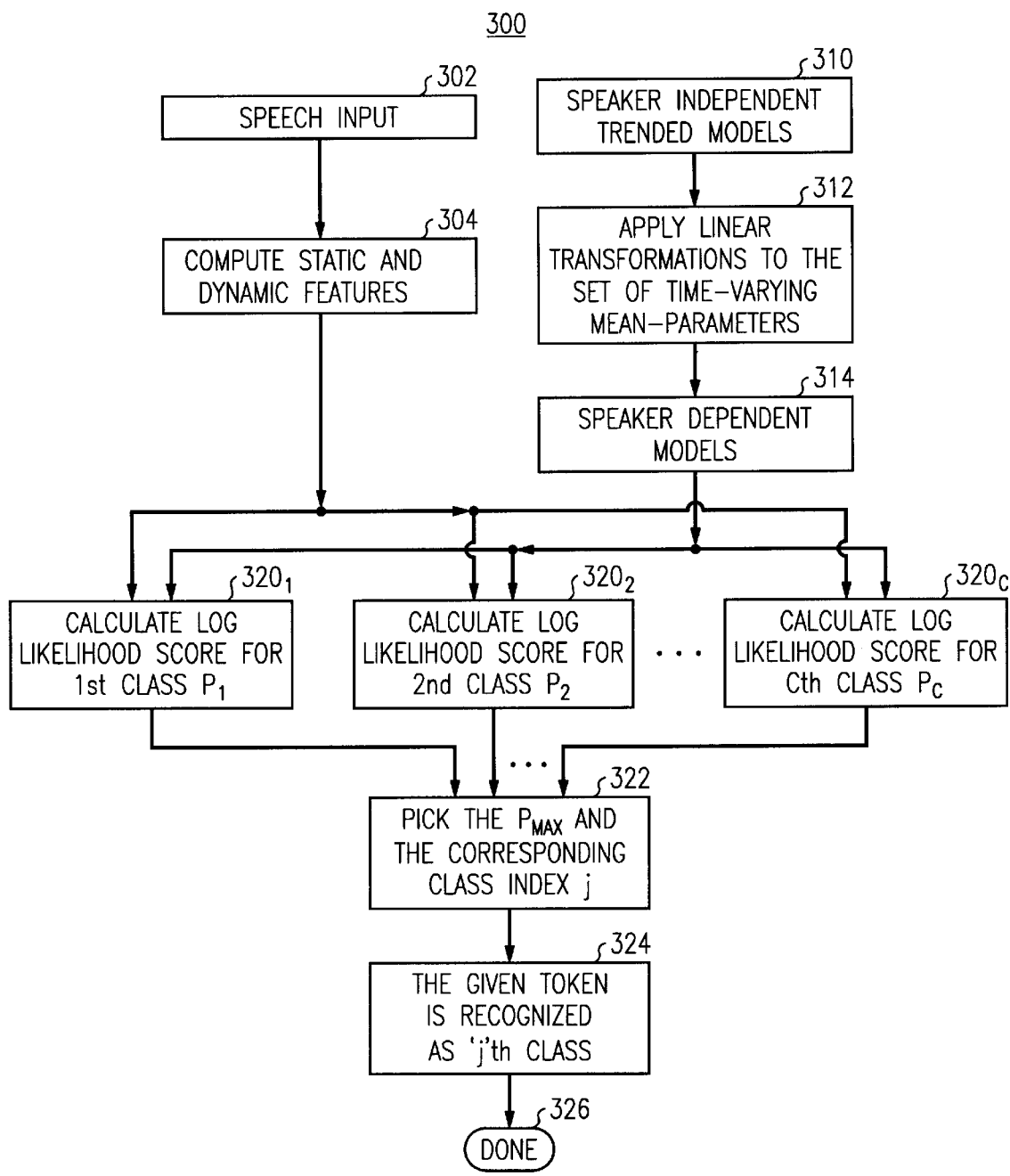
FIG. 3 is a logical flow of the speech recognition method according to the invention.

Referring now to FIG. 3, a method 300 for speech recognition according to the invention will be described. Method 300 receives speech input from a specific speaker at operation 302. This speech input will be digitized and processed into data for speech recognition in the normal manner. The processed input speech is transmitted to operation 304 where static and dynamic features of the speech input of the specific speaker data are computed. Next, these computed static and dynamic features are transmitted in parallel to each of a plurality of C of operations $320_1$–$320_C$. Each of the operations $320_1$–$320_C$ calculates a log likelihood score $P_1$–$P_C$ of its respective class 1–C as will be explained below.

Method 300 also has a model of a compilation of trended HMMs for each class in operation block 310, similar to block 210 of method 200. Block 310 transmits a model of its compilation of trended HMMs to block 312. At block 312, linear transformations are applied to a set of time-varying mean parameters in the trended HMMs. As mentioned before, the main differences between speakers are taken to be purely represented by the time-varying mean parameters of the models. Block 312 transmits a model that has had its time-varying mean-parameters linearly transformed to block 314. Block 314 further applies speaker dependent models to the linearly transformed time-varying parameters from block 312 and distributes the resulting model that has been adapted to a specific speaker to second inputs of operations $320_1$–$320_C$. Each of the operations $320_1$–$320_C$ calculates a log likelihood score $P_1$–$P_C$ of its respective class 1–C calculates a log likelihood score $P_1$–$P_C$ of its respective class 1–C. Each of the outputs of blocks $320_1$–$320_C$ is a log likelihood score $P_j$ its respective class j. The operation at block 322 selects the maximum log likelihood score and the corresponding class index j of the data outputs of $320_1$–$320_C$. The operation at block 324 recognizes the utterance represented by the speech input to block 302 as j-th class. This recognition of the speaker specific utterance or speech input is the desired result, after the operation at block 324 the method 300 moves to operation 326 which is the completion of the utterance. If, however, the utterance is not completed the method 300 returns to block 302 from block 324 one or more time until recognition of the utterance is completed.

In Operation

The experiments to test speaker adaption and evaluate the MCELR approach, which was aimed at recognizing the 26 letters in the English alphabet. These 26 letters are contained in the TI46 speaker dependent isolated word corpus. It is produced by 16 speakers, eight males and eight females. The speaker-independent (SI) training set consists of 26 tokens per word from each of six male and six female speakers. For the remaining four speakers (f1, f2, m1 and m2), up to three tokens of each word are used as adaptation training data, and the remaining 16 tokens used as speaker dependent test data. The preprocessor produces a vector of 26 elements consisting of 13 Mel-frequency cepstral coefficients (MFCCs) and 13 delta MFCCs for every 10 msec of speech. Each word is represented by a single left-to-right, three-state HMM (no skips) with mixture Gaussian state observation densities. The speaker-dependent (ML) models are trained from adaptation data using five-iterations of the modified Viterbi algorithm with single mixture for each state in the HMMs. To set up a baseline speaker-independent (SI) performance on the test data set, ML models were created, which had been well trained using the SI training set, with a single mixture distribution for each state in the HMMs. For the MCELR approach, the global transformation matrix is initialized by the d×d identity matrix. Note that the above initialization gives rise to the trended HMM model parameters without adapting the time-varying means. The average recognition rates (averaged over two males and two females) are summarized in Table 1 shown in FIG. 3 for three experimental setups: 1) benchmark speaker-independent (SI) experiments; 2) speaker-dependent (ML) experiments; 3) speaker-adaptation experiments adapting only polynomial coefficients for the time-varying means (MCELR). Compared with speaker-independent models, the MCELR adaptive training procedure achieves consistently better performance even with a single token in the adaptation data. In the MCELR experiments, the best error rate reduction of 22.58% is obtained when moving from P=0 (80.29%) model to P=1 (84.74%) model with three adaptation tokens. The rate drops gradually with fewer adaptation tokens for MCELR experiments. In contrast, for ML experiments, the rate drops rapidly when the training tokens reduce from three to one. The best speech recognition rate of 84.74% is achieved when time-varying mean parameters are adapted using all three tokens of adaptation data.

Experiments have shown the advantages of the global linear regression based speaker adaptation technique using MCE-based discriminative training paradigm (MCELR). That it was developed, implemented and evaluated for optimally estimating the time-varying polynomial Gaussian mean functions in the trended HMM. Compared with speaker-independent models, the MCELR adaptive training procedure achieves consistently better performance even with a single token in the adaptation data. An error rate reduction of 61% is achieved when moving from ML to MCELR adaptation scheme in case of linear trended models using a single token in the adaptation data, according to the present invention.

Thus, it will now be understood that there has been disclosed a new method for speech recognition in trended HMMs. While the invention has been particularly illustrated and described with reference to preferred embodiments thereof, it will be understood by those skilled in the art that various changes in form, details, and applications may be made therein. It is accordingly intended that the appended claims shall cover all such changes in form, details and applications which do not depart from the true spirit and scope of the invention.

What is claimed is:

1. A model-space transformation method for speech recognition comprising the steps of:

applying a linear transformation to a trended HMM; and estimating mean parameters of said trended HMM with a minimum classification error (MCE) training;

said linear transform applying step adapting a set of speaker independent models to a specific speaker by applying a set of linear transformations to respective Gaussian mean vectors thereof.

2. The method of claim 1 wherein:

said estimating step includes optimally estimating linear transformations to a set of time-varying mean parameters in the trended HMM.

3. The method of claim 1 further comprising the steps of:

said estimating step includes MCE training that optimally estimates a block-diagonal transformation to a set of time-varying mean parameters in the trended HMM;

wherein diagonal blocks of said block-diagonal transformation separately transform static and dynamic features and off diagonal blocks have no effect.

4. The method of claim 3 wherein said block-diagonal transformation leads to fewer parameters and more robust estimations with limited amounts of adaption data.

5. The method of claim 4, wherein said limited amounts of adaption data is at least one token of adaption data.

6. The method of claim 4, wherein said limited amounts of adaption data is at least one token and less than four tokens of adaption data.

7. A method of recognizing speech, comprising the steps of:

applying global linear regression based speaker adaption using MCE-based discriminative training in a trended HMM;

optimally estimating time varying polynomial Gaussian mean functions in the trended HMM; and sequentially performing modified viterbi score calculations for each alphabet classification task.

* * * * *